H. GRÖNROOS.
PROCESS FOR PRODUCTION OF ARTIFICIAL STONES OR SLABS OF MARBLE LIKE APPEARANCE.
APPLICATION FILED JUNE 20, 1919.
1,341,979.
Patented June 1, 1920.
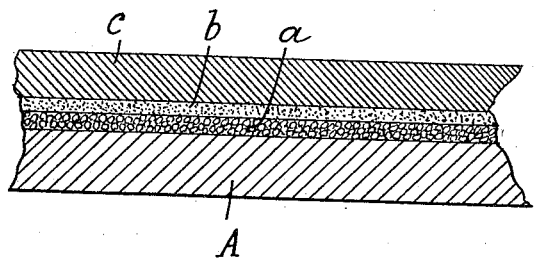
INVENTOR:
Hugo Grönroos
By Wm Wallace White
ATTY.

UNITED STATES PATENT OFFICE.

HUGO GRÖNROOS, OF COPENHAGEN, DENMARK.

PROCESS FOR PRODUCTION OF ARTIFICIAL STONES OR SLABS OF MARBLE-LIKE APPEARANCE.

1,341,979.   Specification of Letters Patent.   Patented June 1, 1920.

Application filed June 20, 1919. Serial No. 305,700.

*To all whom it may concern:*

Be it known that I, HUGO GRÖNROOS, a citizen of Finland, residing at Copenhagen, in the Kingdom of Denmark, have invented new and useful Improvements in Processes for Production of Artificial Stones or Slabs of Marble-Like Appearance, of which the following is a specification.

The present invention relates to a process for production of artificial stones or slabs of marble-like appearance by fusion of substances consisting essentially of porcelain, faience and glass-refuse in crushed state. The novel feature of the invention consists in the mixture being composed of about equal parts of porcelain or faience-refuse, pipe-clay in finely powdered state and crushed glass, while for the layer forming the surface of the stone or slab use is made, in known manner, of crushed porcelain or faience-refuse and crushed glass-refuse, which is spread on the bottom of the mold, wherein the fusion is performed.

The accompanying drawing is a fragmentary sectional view of a slab prepared according to the present invention and illustrating the disposition of the component layers of the block or slab.

In carrying out the process, there is used, preferably, a mixture of about 1 part by weight of crushed porcelain or faience refuse, about 1 part by weight of pipe-clay in finely powdered state and about 1 part by weight of crushed glass-refuse, these substances being mixed well together and moistened by water, so that the mixture acquires such consistency that it becomes coherent when exposed to pressure.

When the mass is mixed, it is pressed in a mold of suitable size, and, preferably, fitted with a loose bottom plate, whose upper surface is plane or smoothly ground. Before the mass is filled into the mold, there is spread on the bottom plate A thereof a uniform layer of crushed porcelain refuse *a* in pieces of about ⅛ inch and, on top of that, a similar layer of crushed glass-refuse *b*, consisting of equal parts of green and white glass, and the moistened mass *c* is then spread on top of the said layers.

The mass is now exposed to a pressure of up to about 2850 lbs. per square inch, whereby slabs or the like are produced. These are then exposed to fusion, for about a quarter of an hour, in a kiln at a temperature from about 900 to 1200° C. While being fused the slab must rest, with the porcelain-refuse side downward, which side is intended to be the face of the block or slab, on a plane support which preferably may consist of a plate of fireproof clay or the like. The burning causes a fusion of the glass contained in the mass, and the liquid or soft mass settles at the bottom face of the slab, so that the latter receives a glassy coating. After the fusion is finished, the slabs are placed on edge for cooling, and after cooling they are ready for immediate use.

The slabs may be manufactured in any size and thickness, and they will not warp during fusion, but will remain perfectly plane or will adjust themselves to the shape of the bottom plate. After the cooling following the fusion is finished, the slabs will possess a hardness corresponding fully to that of natural marble.

By the addition of glass-refuse of various colors, there may be attained variations in the appearance of the finished slab, and special color-substances may be added to the mixture before it is pressed.

The slabs may, preferably, be used as covering of building fronts, as wall-tiles for outer as well as for inner wall-covering, especially in vestibules, business-premises or the like, and for wash-stands, tables, bath-rooms, toilet-rooms and the like.

After being fused, the slabs appear with a perfectly plane and smooth surface requiring no grinding. There is no objection against finishing the surface by grinding, however, and in that case it is re-glazed by a second fusion in a glass-furnace. The slabs may be divided by sawing, and holes may be drilled in them as in natural marble.

As the material used consists mainly of waste substances, the slabs manufactured will be exceedingly cheap.

Having now particularly described and ascertained the nature of my said invention and in what manner the same is to be performed, I declare that what I claim is:—

1. Process for production of artificial stone or slabs of marble-like appearance, by fusion of substances consisting mainly of porcelain, faience and glass-refuse in crushed state, characterized in that the mixture is composed of nearly equal parts of porcelain or faience-refuse, pipe-clay in finely powdered state and crushed glass, there being used, in known manner, for the layer forming the surface of the stone or slab, crushed porcelain-refuse, which is spread on the bottom of the mold wherein the fusion is performed.

2. Process as the one specified in claim 1, characterized in that a mixture of about 1 part by weight of porcelain or faience-refuse, about 1 part by weight of pipe-clay in finely powdered state and about 1 part by weight of crushed glass-refuse in moistened state is spread on top of a layer of crushed glass-refuse, on top of another layer of crushed porcelain-refuse and is exposed in a mold, to a pressure of up to about 2850 lbs. per square inch and then, in a fusing furnace, is exposed for about a quarter of an hour to a temperature of from 900 to 1200° C.

In testimony whereof I have signed my name to this specification.

HUGO GRÖNROOS.

Witnesses:
V. BELSCHUER,
A. ALLESTRUP.